US011424786B2

(12) United States Patent
Tanaka et al.

(10) Patent No.: US 11,424,786 B2
(45) Date of Patent: Aug. 23, 2022

(54) WIRELESS TRANSMISSION SYSTEM, CONTROL METHOD, AND STORAGE MEDIUM

(71) Applicant: CANON KABUSHIKI KAISHA, Tokyo (JP)

(72) Inventors: Yu Tanaka, Tokyo (JP); Hidetada Nago, Hiroshima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/491,214

(22) Filed: Sep. 30, 2021

(65) Prior Publication Data
US 2022/0109469 A1  Apr. 7, 2022

(30) Foreign Application Priority Data
Oct. 5, 2020  (JP) .............................. JP2020-168581

(51) Int. Cl.
*H04B 3/56*  (2006.01)
(52) U.S. Cl.
CPC ....... *H04B 3/56* (2013.01); *H04B 2203/5441* (2013.01); *H04B 2203/5483* (2013.01)
(58) Field of Classification Search
CPC .............. H04B 3/56; H04B 2203/5441; H04B 2203/5483
See application file for complete search history.

(56) References Cited

U.S. PATENT DOCUMENTS 10,348,365 B2 * 7/2019 Kuroda ................ H05K 1/0243
2019/0067774 A1 * 2/2019 Yang .................... H01P 5/227
2019/0245575 A1 * 8/2019 Yukimasa .............. H04B 1/40

FOREIGN PATENT DOCUMENTS

JP          0445505 A    2/1992

* cited by examiner

*Primary Examiner* — Sung S Ahn
(74) *Attorney, Agent, or Firm* — Canon U.S.A., Inc. I.P. Division

(57) ABSTRACT

A wireless transmission system includes first and second transmission line couplers. The first transmission line coupler is arranged in an annular shape and formed of a pair of signal lines that transmit a differential signal. The second transmission line coupler is shorter than the first transmission line coupler and formed of a pair of signal lines that transmit a differential signal. The first and second transmission line couplers are arranged so that, if at least one of the first and second transmission line couplers rotates about a rotational axis and if one of the signal lines of the second transmission line coupler crosses a gap between the ends of one of the signal lines of the first transmission line coupler, the other signal line of the second transmission line coupler does not cross a gap between the ends of the other signal line of the first transmission line coupler.

9 Claims, 5 Drawing Sheets

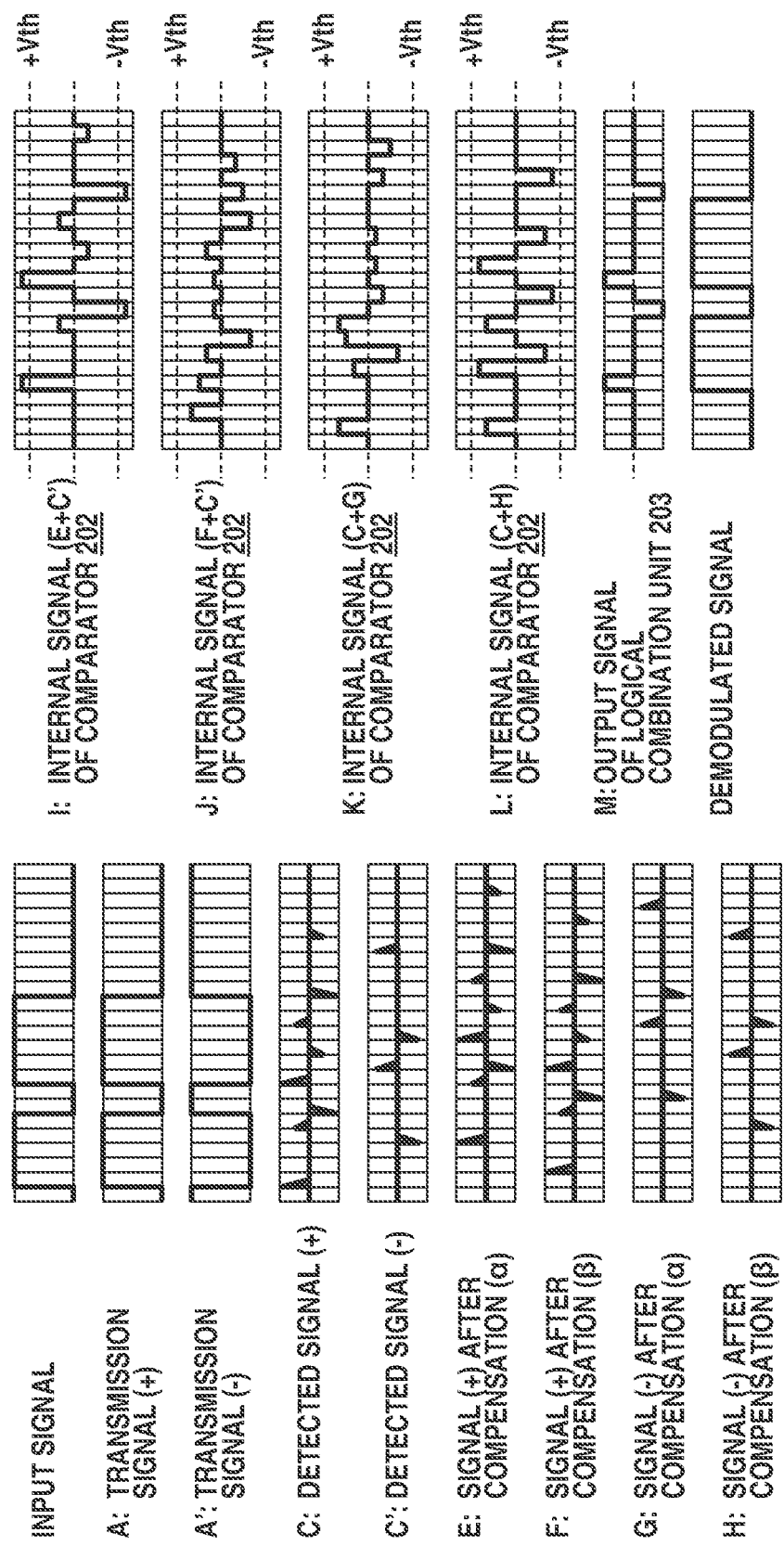

FIG.4A

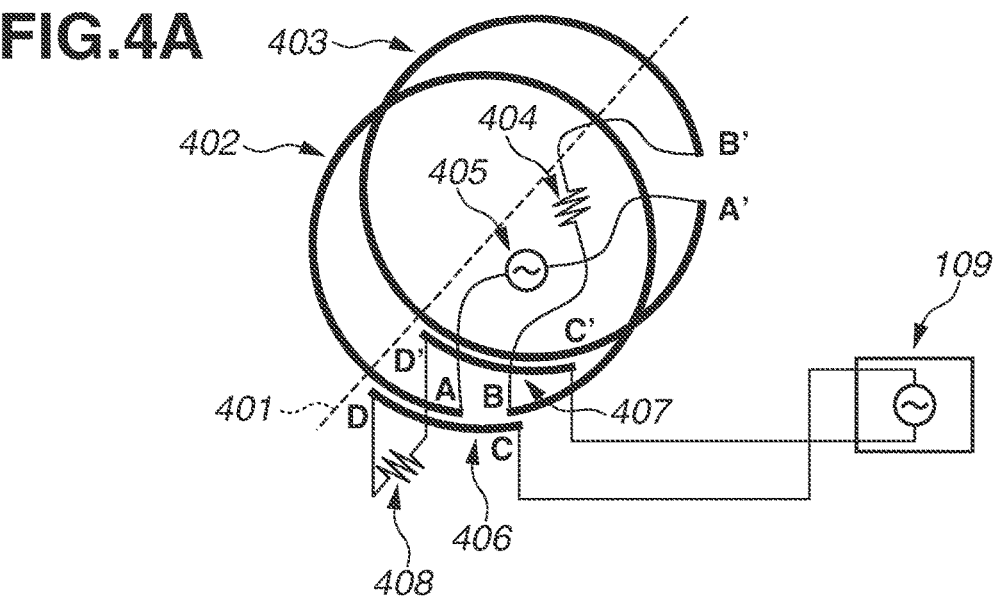

FIG.4B

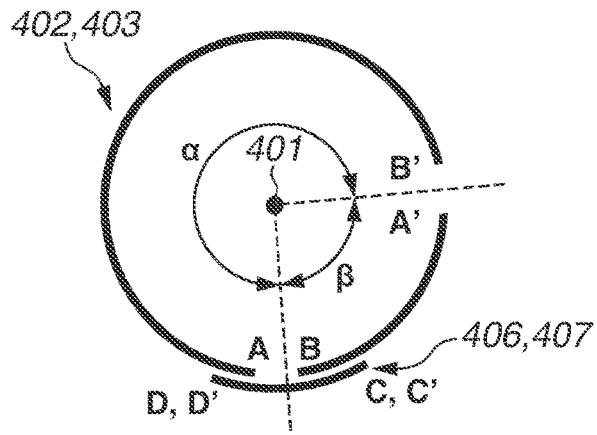

FIG.4C

| | |
|---|---|
| INPUT SIGNAL | I: INTERNAL SIGNAL (E+C') OF COMPARATOR 202 +Vth / -Vth |
| A: TRANSMISSION SIGNAL (+) | J: INTERNAL SIGNAL (F+C') OF COMPARATOR 202 +Vth / -Vth |
| A': TRANSMISSION SIGNAL (-) | K: INTERNAL SIGNAL (C+G) OF COMPARATOR 202 +Vth / -Vth |
| C: DETECTED SIGNAL (+) | L: INTERNAL SIGNAL (C+H) OF COMPARATOR 202 +Vth / -Vth |
| C': DETECTED SIGNAL (-) | |
| E: SIGNAL (+) AFTER COMPENSATION (α) | M: OUTPUT SIGNAL OF LOGICAL COMBINATION UNIT 203 |
| F: SIGNAL (+) AFTER COMPENSATION (β) | |
| G: SIGNAL (-) AFTER COMPENSATION (α) | DEMODULATED SIGNAL |
| H: SIGNAL (-) AFTER COMPENSATION (β) | |

WIRELESS TRANSMISSION SYSTEM, CONTROL METHOD, AND STORAGE MEDIUM

BACKGROUND

Field

The present disclosure relates to a system that wirelessly transmits a signal.

Description of the Related Art

A slip ring is provided as a conventional data transmission method using a rotator. Japanese Patent Application Laid-Open No. 4-45505 discusses an example where a slip ring is applied to a video tape head. In a system discussed in Japanese Patent Application Laid-Open No. 4-45505, an electric signal is input to one end of a ring-shaped first transmission line, and the other end is terminated. Furthermore, a signal is detected from a second transmission line opposed to the first transmission line. In a case where an electric signal is transmitted through the first transmission line, a transmission delay occurs. Thus, in a case where the second transmission line is close to the signal input end of the first transmission line, the delay amount of a variable delay unit connected to the second transmission line is increased, and in a case where the second transmission line is close to the terminal end, the delay amount is reduced, so that the transmission delay in transmitting the signal through the first transmission line is cancelled, which makes the delay amount constant.

In order to transmit a differential signal, two combinations of the first transmission line and the second transmission line opposed to the first transmission line that are discussed in Japanese Patent Application Laid-Open No. 4-45505 are to be used. FIGS. 5A and 5B illustrate the configuration of a system including the two first transmission lines and the two second transmission lines. If open ends (signal input ends and terminal ends) of the two first transmission lines are close to each other and located at the same position, and if the two second transmission lines are opposed to the two first transmission lines to cross the open ends, respectively, there is a possibility that received signals are combined together in the second transmission lines (refer to FIG. 5C). The signals combined in the second transmission lines remain combined also when output from the variable delay unit. Thus, erroneous data may be output.

SUMMARY

Various embodiments of the present disclosure seek to prevent the output of erroneous data, in a case where a differential signal is transmitted using a first transmission line coupler having a gap and a second transmission line coupler opposed to the first transmission line coupler in a noncontact manner.

According to one embodiment of the present disclosure, a wireless transmission system includes a first transmission line coupler arranged in an annular shape, and formed of a pair of signal lines configured to transmit a differential signal, wherein a transmission unit and a terminal resistor are connected to one end and another end of each of the signal lines, respectively, and a second transmission line coupler shorter than the first transmission line coupler, and formed of a pair of signal lines configured to transmit a differential signal, wherein a reception unit and a terminal resistor are connected to one end and another end of each of the signal lines, respectively. The first transmission line coupler and the second transmission line coupler are opposed to each other in a noncontact manner to communicate an electric signal using electric field coupling and/or magnetic field coupling. The first transmission line coupler and the second transmission line coupler are arranged so that, in a case where at least one of the first transmission line coupler or the second transmission line coupler rotates about a rotational axis passing through a center of the first transmission line coupler and in a case where one of the pair of the signal lines of the second transmission line coupler crosses a gap between the ends of one of the signal lines of the first transmission line coupler, the other signal line of the second transmission line coupler does not cross a gap between the ends of the other signal line of the first transmission line coupler.

Further features of the present disclosure will become apparent from the following description of example embodiments with reference to the attached drawings.

BRIEF DESCRIPTION OF THE DRAWINGS

FIG. 3 is a diagram illustrating a timing chart according to the first example embodiment.

FIGS. 4A and 4B are each a system configuration diagram according to a second example embodiment. FIG. 4C is a diagram illustrating a timing chart according to the second example embodiment.

DESCRIPTION OF THE EMBODIMENTS

Example embodiments of the present disclosure will be described in detail below with reference to the attached drawings. The configurations illustrated in the following example embodiments are merely examples, and the present disclosure is not limited to the illustrated configurations.

Figure 1A:
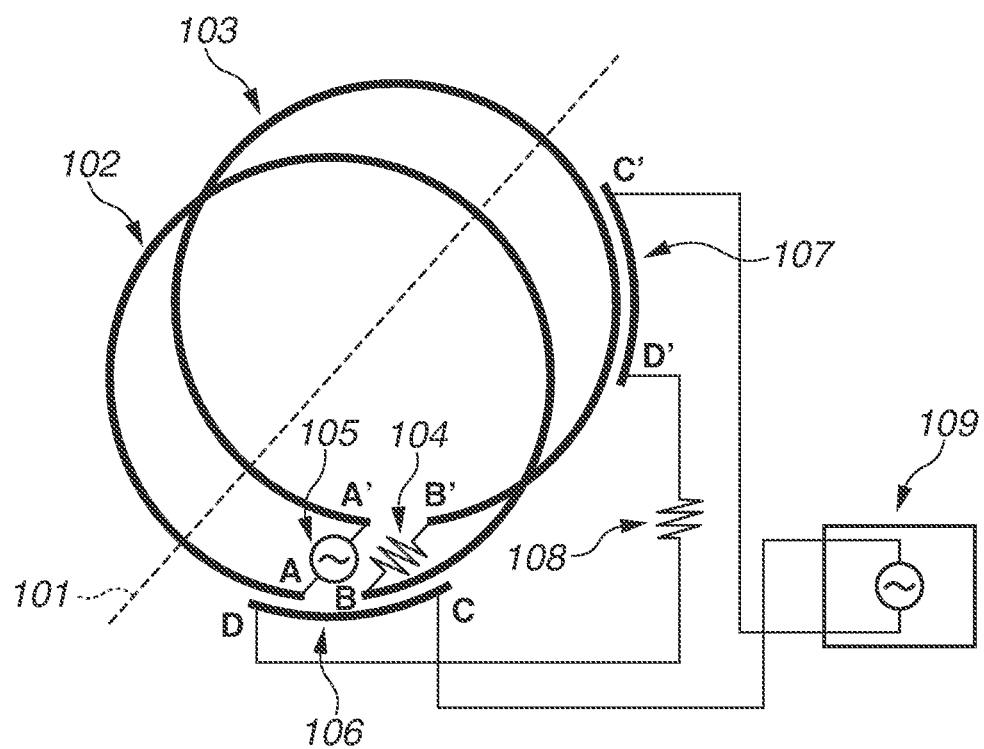
FIGS. 1A and 1B are each a system configuration diagram according to a first example embodiment.

FIG. 1A illustrates a system configuration diagram of a wireless transmission system according to a first example embodiment of the present disclosure. The wireless transmission system illustrated in FIG. 1A includes transmission line couplers 102 and 103 that are arranged in an annular shape on a differential signal transmission side. A transmission unit 105 serving as a signal source is connected to one end A of the transmission line coupler 102 and one end A' of the transmission line coupler 103. A terminal resistor 104 is connected to the other ends B and B' of the transmission line couplers 102 and 103, respectively. Hereinafter, the transmission line couplers 102 and 103 on the differential signal transmission side will be simply referred to as the transmission couplers 102 and 103. There is a gap between the open ends A and B of the transmission coupler 102 and between the open ends A' and B' of the transmission coupler 103. The wireless transmission system according to the present example embodiment includes a pair of signal lines as transmission couplers and a pair of signal lines as reception couplers.

Transmission line couplers 106 and 107 are arranged on a circumference on a differential signal reception side. A reception unit 109 is connected to one end C of the transmission line coupler 106 and one end C' of the transmission line coupler 107. A terminal resistor 108 is connected to the other ends D and D' of the transmission line couplers 106 and 107, respectively. Hereinafter, the transmission line couplers 106 and 107 on the differential signal reception side will be simply referred to the reception couplers 106 and 107.

The reception couplers 106 and 107 are arranged to oppose to the transmission couplers 102 and 103, respectively, and are coupled to the transmission couplers 102 and 103, respectively, by the effect of at least one of an electric field and a magnetic field. At this time, in the coupling between the transmission coupler 102 and the reception coupler 106 and the coupling between the transmission coupler 103 and the reception coupler 107, the degrees of coupling are small at a low frequency and great at a high frequency. Thus, when a signal input to the transmission unit 105 is output to the reception unit 109 through the electric field coupling and/or the magnetic field coupling between the transmission coupler 102 and the reception coupler 106 and between the transmission coupler 103 and the reception coupler 107, the signal is similar to a signal having passed through a high-pass filter (HPF).

At least one of the pair of the transmission couplers 102 and 103 and the pair of the reception couplers 106 and 107 can rotate about a rotational axis 101. The rotational axis 101 passes through the centers of the transmission couplers 102 and 103.

Figure 1B:
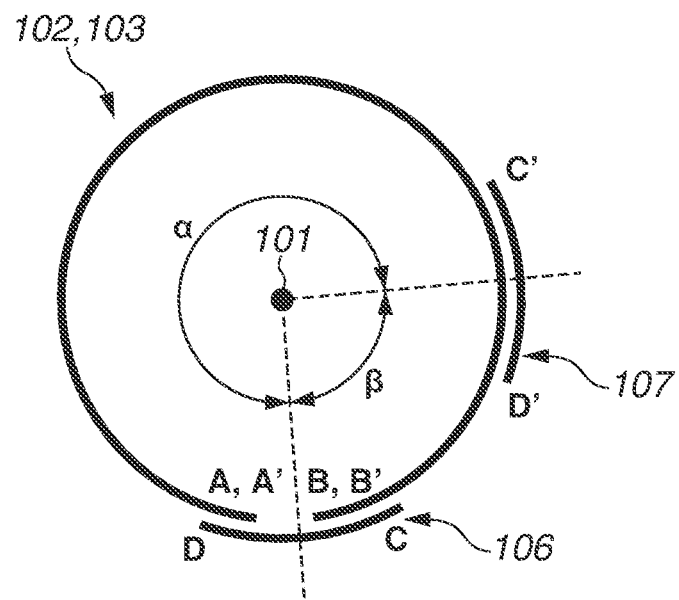

FIG. 1B illustrates a system configuration diagram in a case where the wireless transmission system illustrated in FIG. 1A is viewed from a viewpoint in a reference direction perpendicular to the rotational axis 101. The gap between the open ends A and B of the transmission coupler 102 and the gap between the open ends A' and B' of the transmission coupler 103 are narrower than the length of each of the reception couplers 106 and 107, and are arranged at positions overlapping each other along the rotational axis 101. On the other hand, the reception couplers 106 and 107 are arranged at positions that do not overlap each other along the rotational axis 101.

FIG. 1B illustrates a case where the reception coupler 106 crosses the gap between the open ends A and B of the transmission coupler 102. In this case, a positional difference on a wide angle side between the reception couplers 106 and 107 is defined as an angle α, and a positional difference on a narrow angle side between the reception couplers 106 and 107 is defined as an angle β. It is assumed here that the speed at which the wireless transmission system according to the present example embodiment rotates about the rotational axis 101 is constant, and the angles α and β do not change and are constant even during the rotation.

Figure 2:
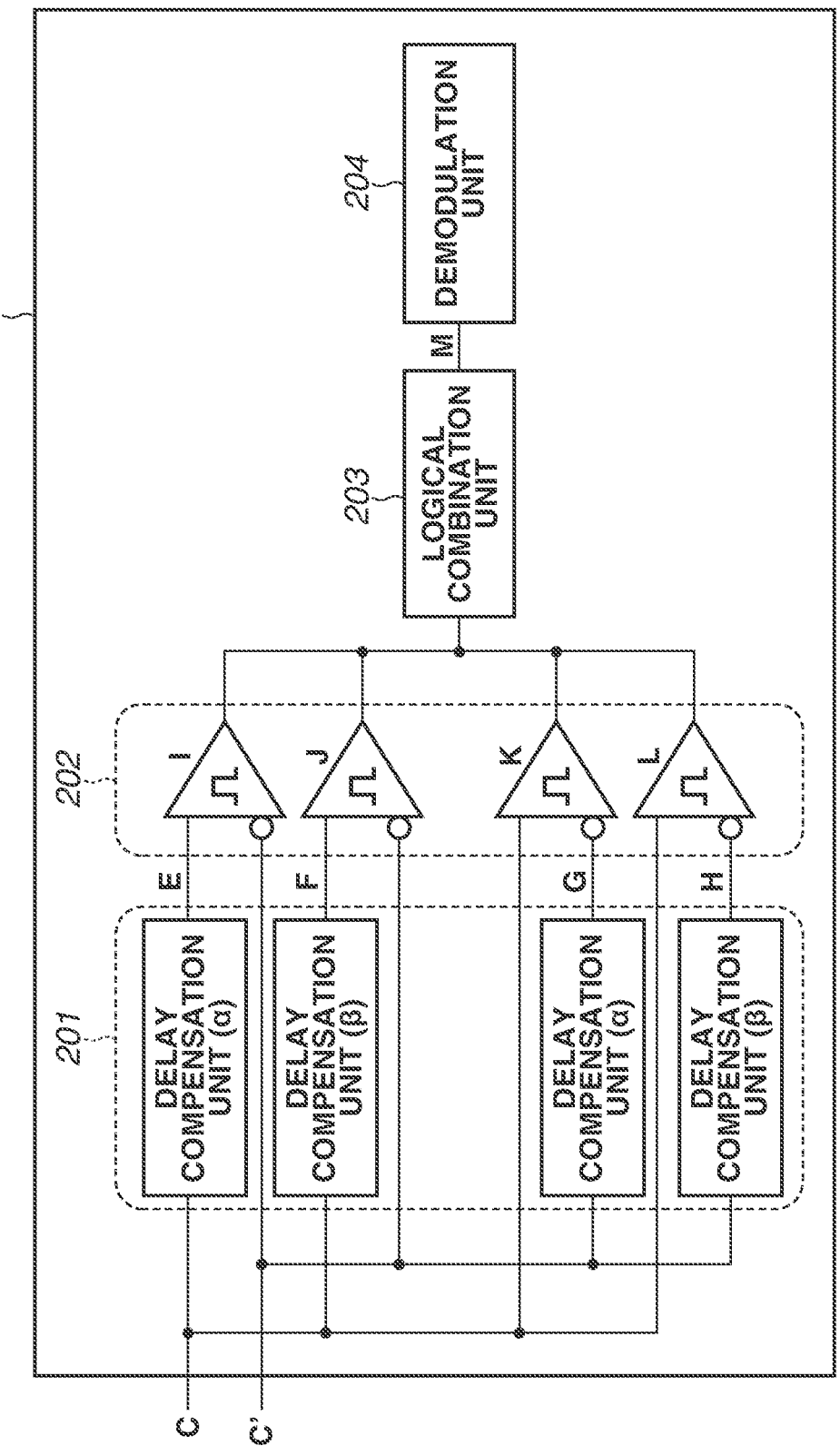
FIG. 2 is a diagram illustrating a configuration of a reception unit according to the first example embodiment.
Figure 5A:
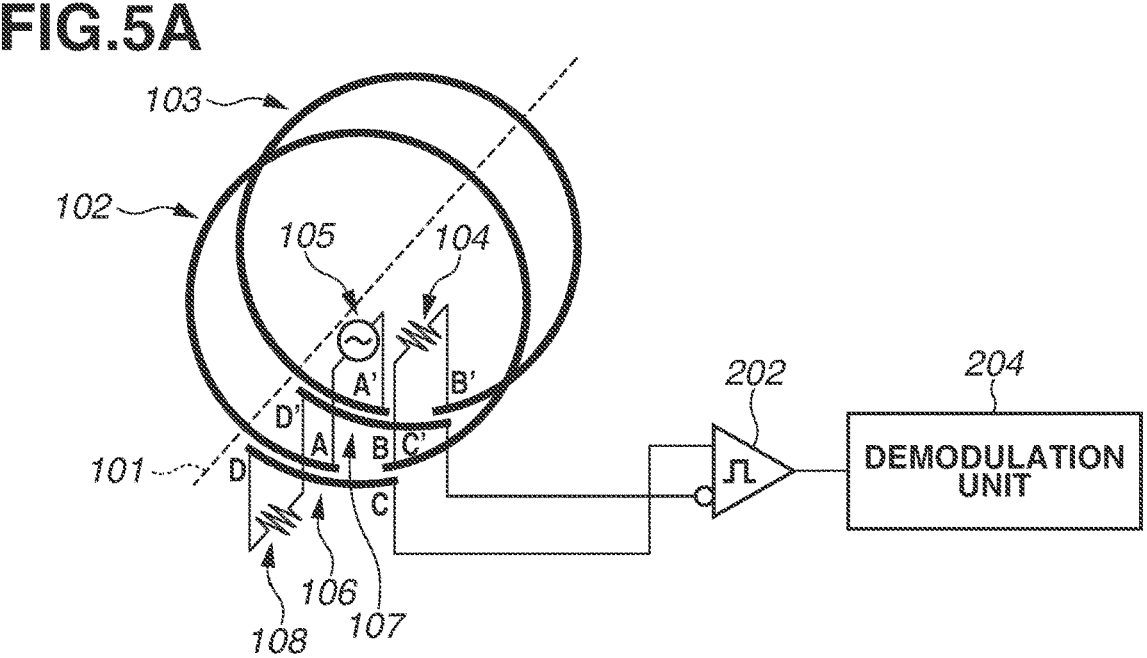
FIGS. 5A and 5B are each a system configuration diagram for describing an issue relating to a system including two first transmission lines and two second transmission lines.
Figure 5B:
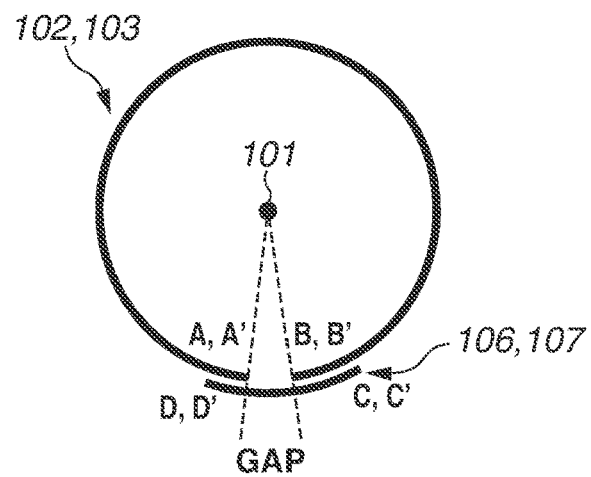
Figure 5C:
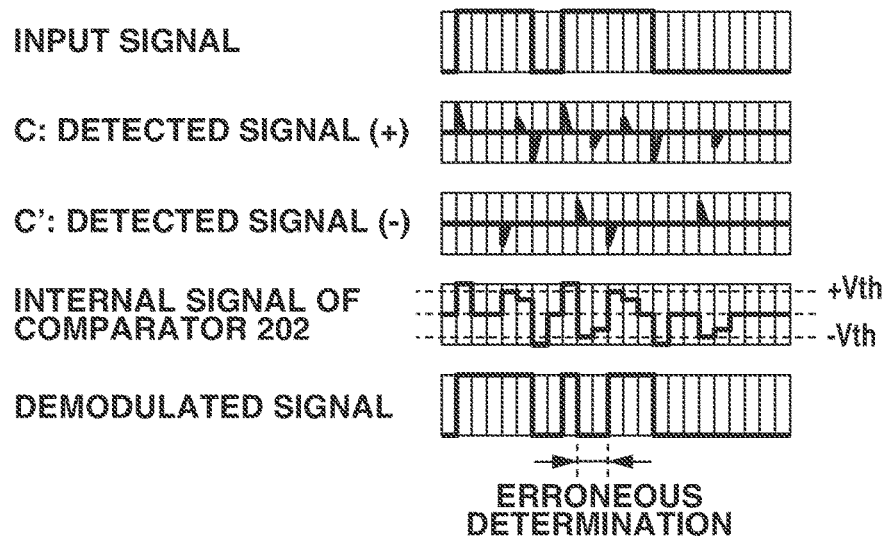
FIG. 5C is a diagram illustrating a timing chart for describing the issue.

FIG. 2 illustrates a configuration of the reception unit 109. Signals output from the ends C and C' of the reception couplers 106 and 107 are each divided into four signals. Then, the signals pass through delay compensation units 201 and comparators 202, and flow to a logical combination unit 203 and a demodulation unit 204.

Each of the delay compensation units 201 has a delay time based on the angle α and/or the angle β, and outputs an input signal by delaying the signal by the delay time.

Each of the comparators 202 has hysteresis characteristics. If an input signal exceeds a threshold voltage (+Vth), the comparator 202 detects a leading edge of the input signal. If the input signal falls below the threshold voltage (−Vth), the comparator 202 detects a falling edge of the input signal.

The logical combination unit 203 obtains the OR (logical disjunction) of waveform-shaped outputs from the comparators 202 and outputs the OR to the demodulation unit 204. The demodulation unit 204 demodulates an input signal.

FIG. 3 illustrates a timing chart of the wireless transmission system according to the present example embodiment. FIG. 3 illustrates signal waveforms of output signals (compensation signals) E, F, G, and H of the four delay compensation units 201, internal signals I, J, K, and L of the four comparators 202, and an output signal M of the logical combination unit 203, which are illustrated in FIG. 2.

The transmission unit 105 serving as a signal source differentially amplifies an input signal that is a random digital waveform represented by "1" or "0", and then inputs a positive transmission signal A to the transmission coupler 102 and a negative transmission signal A' to the transmission coupler 103.

The positive transmission signal A input to the transmission coupler 102 is output to the reception coupler 106 through the electric field coupling and/or the magnetic field coupling. A signal C detected by the reception coupler 106 is a differentiated waveform corresponding to change points of the positive transmission signal A. At this time, the ends D and C of the reception coupler 106 are coupled to the ends A and B of the transmission coupler 102, respectively, and the signal C is a combined wave of a differentiated waveform resulting from the coupling between the ends A and D and a differentiated waveform resulting from the coupling between the ends B and C. With respect to the differentiated waveform resulting from the coupling between the ends A and D, the differentiated waveform resulting from the coupling between the ends B and C has a delay time equal to a time corresponding to about one round (the angle α+β) of the transmission coupler 102 along the rotational axis 101.

Similarly, the negative transmission signal A' input to the transmission coupler 103 is output to the reception coupler 107 through the electric field coupling and/or the magnetic field coupling. A signal C' detected by the reception coupler 107 is a differentiated waveform corresponding to change points of the negative transmission signal A'. At this time, with respect to the differentiated waveform resulting from the coupling between the ends A and D, a differentiated waveform resulting from the coupling between the ends A' and D' has a delay time equal to a time corresponding to the angle α of the transmission coupler 103 along the rotational axis 101.

Next, the compensation signals E to H are obtained by the delay compensation units 201 giving a delay time based on the angle α or β to each of the signals C and C' detected by the reception couplers 106 and 107. The compensation signals E to H and the detected signals C and C' are then input to the comparators 202 connected in parallel to one another.

The internal signal I is obtained by inputting the compensation signal E and the detected signal C' to one of the comparators 202. The internal signal J is obtained by inputting the compensation signal F and the detected signal C' to one of the comparators 202. The internal signal K is obtained by inputting the detected signal C and the compensation signal G to one of the comparators 202. The internal signal L is obtained by inputting the detected signal C and the compensation signal H to one of the comparators 202. At this time, the internal signal I falls outside the threshold voltage |Vth| at a total of four change points corresponding to the leading edges and the falling edges, but the other internal signals J to L fall within the threshold voltage |Vth|. Based on the above, the logical combination unit 203 outputs only the output signal M having similar four change points, thereby generating a signal equivalent to the signals input to the transmission couplers 102 and 103, as a demodulated signal.

In the wireless transmission system illustrated in FIGS. 1A and 1B, if the reception couplers 106 and 107 rotate clockwise, the reception coupler 106 does not cross the gap between the open ends A and B of the transmission coupler 102. Thus, the differentiated waveform resulting from the coupling between the ends B and C disappears, and only the differentiated waveform resulting from the coupling between the ends A and D is detected. In this case, a combined wave that destabilizes the demodulation disappears and thus the reception unit 109 can easily perform the demodulation.

If the reception couplers 106 and 107 further rotate clockwise, the reception coupler 107 crosses the gap between the open ends A' and B' of the transmission coupler 103. Accordingly, the ends D' and C' of the reception coupler 107 are coupled to the ends A' and B' of the transmission coupler 103, respectively. Also in this case, a combined wave of the differentiated waveform resulting from the coupling between the ends A' and D' and a differentiated waveform resulting from the coupling between the ends B' and C' is detected, but the demodulation can be performed by similar processing by the reception unit 109.

As described above in the present example embodiment, the reception couplers 106 and 107 are arranged so as not to overlap each other when viewed from the reference viewpoint perpendicular to the rotational axis 101, whereby it is possible to prevent signals from being combined together in the reception couplers 106 and 107.

In the present example embodiment, the transmission line couplers 102 and 103 are defined as the transmission couplers, and the transmission line couplers 106 and 107 are defined as the reception couplers. The configuration, however, is not limited thereto. Alternatively, the transmission line couplers 102 and 103 may be the reception couplers, and the transmission line couplers 106 and 107 may be the transmission couplers. In this case, the transmission unit 105 is connected between the ends C and C', and the reception unit 109 is connected between the ends A and A'.

In the first example embodiment, the configuration in which the reception couplers do not overlap each other when viewed from the reference viewpoint perpendicular to the rotational axis has been described. In a second example embodiment, the gaps of the transmission couplers are arranged so as not to overlap each other when viewed from the reference viewpoint. In the second example embodiment, only the differences from the first example embodiment will be described in detail.

FIG. 4A illustrates a system configuration diagram of a wireless transmission system according to the present example embodiment.

In FIG. 4A, transmission line couplers 402 and 403 are arranged in an annular shape on a differential signal transmission side. A transmission unit 405 serving as a signal source is connected to one end A of the transmission line coupler 402 and one end A' of the transmission line coupler 403. A terminal resistor 404 is connected to the other ends B and B' of the transmission line couplers 402 and 403, respectively. Hereinafter, the transmission line couplers 402 and 403 on the differential signal transmission side will be simply referred to as the transmission couplers 402 and 403.

There is a gap between the open ends A and B of the transmission coupler 402 and between the open ends A' and B' of the transmission coupler 403. The wireless transmission system according to the present example embodiment includes a pair of signal lines as transmission couplers and a pair of signal lines as reception couplers.

Transmission line couplers 406 and 407 are arranged on a circumference on a differential signal reception side. The reception unit 109 is connected to one end C of the transmission line coupler 406 and one end C' of the transmission line coupler 407. A terminal resistor 408 is connected to the other ends D and D' of the transmission line couplers 406 and 407, respectively. Hereinafter, the transmission line couplers 406 and 407 on the differential signal reception side will be simply referred to as the reception couplers 406 and 407.

The reception couplers 406 and 407 are arranged to oppose to the transmission couplers 402 and 403, respectively, and are coupled to the transmission couplers 402 and 403, respectively, by the effect of at least one of an electric field and a magnetic field. At this time, in the coupling between the transmission coupler 402 and the reception coupler 406 and the coupling between the transmission coupler 403 and the reception coupler 407, the degrees of coupling are small at a low frequency and great at a high frequency. Thus, when a signal input to the transmission unit 405 is output to the reception unit 109 through the electric field coupling and/or the magnetic field coupling between the transmission coupler 402 and the reception coupler 406 and between the transmission coupler 403 and the reception coupler 407, the signal is similar to a signal having passed through an HPF. The reception unit 109 includes components similar to those in FIG. 2.

At least one of the pair of the transmission couplers 402 and 403 and the pair of the reception couplers 406 and 407 can rotate about a rotational axis 401. The rotational axis 401 passes through the centers of the transmission couplers 402 and 403.

FIG. 4B illustrates a system configuration diagram in a case where the wireless transmission system illustrated in FIG. 4A is viewed from a viewpoint in a reference direction perpendicular to the rotational axis 401. The gap between the open ends A and B of the transmission coupler 402 and the gap between the open ends A' and B' of the transmission coupler 403 are narrower than the length of each of the reception couplers 406 and 407, and are arranged at positions that do not overlap each other along the rotational axis 101. On the other hand, the reception couplers 406 and 407 are arranged at positions overlapping each other along the rotational axis 401.

FIG. 4B illustrates a case where the reception coupler 406 crosses the gap between the open ends A and B of the transmission coupler 402. In this case, a positional difference on a wide angle side between the gap of the transmission coupler 402 and the gap of the transmission coupler 403 is defined as an angle α, and a positional difference on a narrow angle side between the gap of the transmission coupler 402 and the gap of the transmission coupler 403 is defined as an angle β. It is assumed here that the speed at which the wireless transmission system according to the present example embodiment rotates about the rotational axis 401 is constant, and the angles α and β do not change and are constant even during the rotation.

FIG. 4C illustrates a timing chart of the wireless transmission system according to the present example embodiment. Similarly to FIG. 3, FIG. 4C illustrates signal waveforms of the output signals (compensation signals) E, F, G, and H of the four delay compensation units 201, the internal signals I, J, K, and L of the four comparators 202, and the output signal M of the logical combination unit 203.

The transmission unit 405 serving as a signal source differentially amplifies an input signal that is a random digital waveform represented by "1" or "0", and then inputs a positive transmission signal A to the transmission coupler 402 and a negative transmission signal A' to the transmission coupler 403.

The positive transmission signal A input to the transmission coupler 402 is output to the reception coupler 406 through the electric field coupling and/or the magnetic field coupling. A signal C detected by the reception coupler 406 is a differentiated waveform corresponding to change points of the positive transmission signal A. At this time, the ends D and C of the reception coupler 406 are coupled to the ends A and B of the transmission coupler 402, respectively, and the signal C is a combined wave of a differentiated waveform resulting from the coupling between the ends A and D and a differentiated waveform resulting from the coupling between the ends B and C. With respect to the differentiated waveform resulting from the coupling between the ends A and D, the differentiated waveform resulting from the coupling between the ends B and C has a delay time equal to a time corresponding to about one round (the angle $\alpha+\beta$) of the transmission coupler 402 along the rotational axis 401.

The negative transmission signal A' input to the transmission coupler 403 is output to the reception coupler 407 through the electric field coupling and/or the magnetic field coupling. A signal C' detected by the reception coupler 407 is a differentiated waveform corresponding to change points of the negative transmission signal A'. At this time, with respect to the differentiated waveform resulting from the coupling between the ends A and D, a differentiated waveform resulting from the coupling between the ends A' and D' has a delay time equal to a time corresponding to the angle $\beta$ of the transmission coupler 403 along the rotational axis 401.

Next, the compensation signals E to H are obtained by the delay compensation units 201 giving a delay time equal to a time corresponding to the angle $\alpha$ or $\beta$, to each of the signals C and C' detected by the reception couplers 406 and 407.

The compensation signals E to H and the detected signals C and C' are then input to the comparators 202 connected in parallel to one another.

The internal signal I is obtained by inputting the compensation signal E and the detected signal C' to one of the comparators 202. The internal signal J is obtained by inputting the compensation signal F and the detected signal C' to one of the comparators 202. The internal signal K is obtained by inputting the detected signal C and the compensation signal G to one of the comparators 202. The internal signal L is obtained by inputting the detected signal C and the compensation signal H to one of the comparators 202. At this time, the internal signal J falls outside the threshold voltage |Vth| at a total of four change points corresponding to the leading edges and the falling edges, but the other internal signals I, K, and L fall within the threshold voltage |Vth|. Based on the above, the logical combination unit 203 outputs only the output signal M having similar four change points, thereby generating a signal equivalent to the signals input to the transmission couplers 402 and 403, as a demodulated signal.

In the wireless transmission system illustrated in FIG. 4A, if the reception couplers 406 and 407 rotate clockwise, the reception coupler 406 does not cross the gap between the open ends A and B of the transmission coupler 402. Thus, the differentiated waveform resulting from the coupling between the ends B and C disappears, and only the differentiated waveform resulting from the coupling between the ends A and D is detected. In this case, a combined wave that destabilizes the demodulation disappears and thus the reception unit 109 can easily perform the demodulation.

If the reception couplers 406 and 407 further rotate clockwise, the reception coupler 407 crosses the gap between the open ends A' and B' of the transmission coupler 403. Accordingly, the ends D' and C' of the reception coupler 407 are coupled to the ends A' and B' of the transmission coupler 403, respectively. Also in this case, a combined wave of the differentiated waveform resulting from the coupling between the ends A' and D' and a differentiated waveform resulting from the coupling between the ends B' and C' is detected, but the demodulation can be performed by similar processing by the reception unit 109.

As described above in the present example embodiment, the gap of the transmission coupler 402 and the gap of the transmission coupler 403 are arranged so as not to overlap each other when viewed from the reference viewpoint perpendicular to the rotational axis 401, whereby it is possible to prevent signals from being combined together in the reception couplers 406 and 407.

In the present example embodiment, the transmission line couplers 402 and 403 are defined as the transmission couplers, and the transmission line couplers 406 and 407 are defined as the reception couplers. The configuration, however, is not limited thereto. Alternatively, the transmission line couplers 402 and 403 may be the reception couplers, and the transmission line couplers 406 and 407 may be the transmission couplers. In this case, the transmission unit 405 is connected between the ends C and C', and the reception unit 109 is connected between the ends A and A'.

The wireless transmission system according to each of the first and second example embodiments may also be able to transmit power in addition to communicating a wireless signal.

According to the above-described example embodiments, in a case where a differential signal is transmitted using a first transmission line coupler having a gap and a second transmission line coupler opposed to the first transmission line coupler in a noncontact manner, it is possible to prevent the output of erroneous data.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2020-168581, filed Oct. 5, 2020, which is hereby incorporated by reference herein in its entirety.

What is claimed is:

1. A wireless transmission system comprising:
a first transmission line coupler arranged in an annular shape, and formed of a pair of signal lines configured to transmit a differential signal, wherein a transmission unit and a terminal resistor are connected to one end and another end of each of the signal lines, respectively; and
a second transmission line coupler shorter than the first transmission line coupler, and formed of a pair of signal lines configured to transmit a differential signal, wherein a reception unit and a terminal resistor are connected to one end and another end of each of the signal lines, respectively,
wherein the first transmission line coupler and the second transmission line coupler are opposed to each other in a noncontact manner to communicate an electric signal using electric field coupling and/or magnetic field coupling, and
wherein the first transmission line coupler and the second transmission line coupler are arranged so that, in a case where at least one of the first transmission line coupler or the second transmission line coupler rotates about a rotational axis passing through a center of the first transmission line coupler and in a case where one of the pair of the signal lines of the second transmission line coupler crosses a gap between the ends of one of the signal lines of the first transmission line coupler, the other signal line of the second transmission line coupler does not cross a gap between the ends of the other signal line of the first transmission line coupler.

2. The wireless transmission system according to claim 1, wherein one of the signal lines of the second transmission line coupler and the other signal line of the second transmission line coupler are arranged so as not to overlap each other when viewed from a viewpoint in a reference direction perpendicular to the rotational axis.

3. The wireless transmission system according to claim 2, further comprising a delay compensation unit configured to compensate for a delay amount based on a positional difference between the pair of the signal lines of the second transmission line coupler.

4. The wireless transmission system according to claim 1, wherein the gap of one of the signal lines of the first transmission line coupler and the gap of the other signal line of the first transmission line coupler are arranged so as not to overlap each other when viewed from a viewpoint in a reference direction perpendicular to the rotational axis.

5. The wireless transmission system according to claim 4, further comprising a delay compensation unit configured to compensate for a delay amount based on a positional difference between the gaps of the pair of the signal lines of the first transmission line coupler.

6. The wireless transmission system according to claim 3, further comprising:
comparators each configured to receive a delay signal for compensating for the delay amount output from the delay compensation unit, and a signal detected by the second transmission line coupler;
a logical combination unit configured to obtain a logical disjunction of waveform-shaped outputs from the comparators; and
a demodulation unit configured to receive and demodulate a signal output from the logical combination unit.

7. The wireless transmission system according to claim 1, wherein in the electric field coupling and/or the magnetic field coupling between the first transmission line coupler and the second transmission line coupler, degrees of coupling are small at a low frequency and great at a high frequency.

8. A method for controlling a wireless transmission system including a first transmission line coupler and a second transmission line coupler, wherein the first transmission line coupler is arranged in an annular shape and formed of a pair of signal lines configured to transmit a differential signal, and a transmission unit and a terminal resistor are connected to one end and another end of each of the signal lines, respectively, and wherein the second transmission line coupler is shorter than the first transmission line coupler and formed of a pair of signal lines configured to transmit a differential signal, and a reception unit and a terminal resistor are connected to one end and another end of each of the signal lines, respectively, the method comprising:
controlling the first transmission line coupler and the second transmission line coupler to be arranged so that, in a case where at least one of the first transmission line coupler or the second transmission line coupler rotates about a rotational axis passing through a center of the first transmission line coupler and in a case where one of the pair of the signal lines of the second transmission line coupler crosses a gap between the ends of one of the signal lines of the first transmission line coupler, the other signal line of the second transmission line coupler does not cross a gap between the ends of the other signal line of the first transmission line coupler; and
opposing the controlled first and second transmission line couplers in a noncontact manner to communicate an electric signal using electric field coupling and/or magnetic field coupling.

9. A non-transitory computer-readable storage medium storing instructions that, when executed by a computer, cause the computer to perform a process for controlling a wireless transmission system including a first transmission line coupler and a second transmission line coupler, wherein the first transmission line coupler is arranged in an annular shape and formed of a pair of signal lines configured to transmit a differential signal, and a transmission unit and a terminal resistor are connected to one end and another end of each of the signal lines, respectively, and wherein the second transmission line coupler is shorter than the first transmission line coupler and formed of a pair of signal lines configured to transmit a differential signal, and a reception unit and a terminal resistor are connected to one end and another end of each of the signal lines, respectively, the process comprising:

controlling the first transmission line coupler and the second transmission line coupler to be arranged so that, in a case where at least one of the first transmission line coupler or the second transmission line coupler rotates about a rotational axis passing through a center of the first transmission line coupler and in a case where one of the pair of the signal lines of the second transmission line coupler crosses a gap between the ends of one of the signal lines of the first transmission line coupler, the other signal line of the second transmission line coupler does not cross a gap between the ends of the other signal line of the first transmission line coupler; and opposing the controlled first and second transmission line couplers in a noncontact manner to communicate an electric signal using electric field coupling and/or magnetic field coupling.

* * * * *